H. M. SUTTON AND W. L. AND E. G. STEELE.
PROCESS OF AND APPARATUS FOR SIZING AND SEPARATING COMMINUTED MATERIAL.
APPLICATION FILED OCT. 26, 1914.

1,315,880.

Patented Sept. 9, 1919.
5 SHEETS—SHEET 1.

H. M. SUTTON AND W. L. AND E. G. STEELE.
PROCESS OF AND APPARATUS FOR SIZING AND SEPARATING COMMINUTED MATERIAL.
APPLICATION FILED OCT. 26, 1914.

1,315,880.

Patented Sept. 9, 1919.
5 SHEETS—SHEET 2.

UNITED STATES PATENT OFFICE.

HENRY M. SUTTON, WALTER L. STEELE, AND EDWIN G. STEELE, OF DALLAS, TEXAS.

PROCESS OF AND APPARATUS FOR SIZING AND SEPARATING COMMINUTED MATERIAL.

1,315,880.     Specification of Letters Patent.     Patented Sept. 9, 1919.

Application filed October 26, 1914. Serial No. 868,726.

*To all whom it may concern:*

Be it known that we, HENRY M. SUTTON, WALTER L. STEELE, and EDWIN G. STEELE, citizens of the United States, residing at Dallas, in the county of Dallas and State of Texas, have invented certain new and useful Improvements in Processes of and Apparatus for Sizing and Separating Comminuted Material, of which the following is a specification, reference being had therein to the accompanying drawing.

This invention relates to certain new and useful improvements in process of and apparatus for sizing and separating comminuted material and is in the nature of an improvement upon our Patents #797,239 granted August 5, 1905; 898,020 granted September 8, 1908; 979,046 granted December 20, 1910, and 1,073,644 granted September 23, 1913, in which are disclosed, separating tables having a pervious deck upon which comminuted material is deposited through which is forced, a uniform upward pressure of air in order to stratify the particles thereof according to specific gravity; the object of this invention being to provide a separating table embodying these principles with sizing channels by means of which, a sizing action can be obtained simultaneously with the separating action, whereby a separating apparatus is provided which is capable of handling imperfectly sized comminuted material.

Another object of our invention is to provide a sizing apparatus in which the sizing surface thereof, is provided with impervious channels into which the heavier particles of the comminuted material are deposited by the gravitation of the mass thereon and from which the heavier particles, which are the values, are gradually discharged therefrom, by the propelling movement of the apparatus.

Another object of the invention is to provide an apparatus with sizing channels which gradully increase in size from the feed side of the table toward the discharge side thereof to accommodate the accumulation of gangue or other particles of the mass caused by the gravitation thereof, said sizing channels also diminishing in size from the head toward the foot of the table.

In prior constructions of separating tables of that class depending upon the specific gravity of the particles in order to obtain the separation thereof, it was necessary to deliver upon said table, particles of substantially the same size which had been previously sized upon a sizing apparatus and it was found that it was impossible to obtain a perfect sizing as the material produces by attrition, fine particles of the mass which could not be separated from one another, and the object of this invention, is to provide means for separating the unsized particles of the mass.

The initial action of a table constructed as herein shown and described on the ore deposited thereon, is identical with that described in our former patents, as when the ore is fed onto the unobstructed pervious portion of the table, it is stratified according to specific gravity by the air, the heaviest particle remaining next to, or upon the pervious floor, the next heaviest above that, and the lightest upon the top, the stratification assuming an angle to the surface of the pervious floor and as the particles are cushioned from each other, the inclination which the strata have assumed, causes them to slide, each from off of the other, the different minerals beginning to form into zones, each taking a well-defined path substantially diagonally along the floor until they reach the first air-retarding strip and sizing channel, which being impervious, allows the heavier minerals which are closest to the pervious surface to drop into the channels and, by the propelling movement of the table, they are propelled longitudinally therein, the smaller or heavier particles gradually crowding the larger or lighter particles out of the channels as they diminish in depth. By this construction, the undersized particles of the mass can be taken care of and the various products separately collected notwithstanding that there may be many different sizes of the same class of minerals as the heavier constituents of one class can be separately collected, regardless of size from the lighter constituents or from the gangue or waste.

In the operation of a sizing and separating apparatus as herein disclosed, the sizing action of the channels is diametrically opposite in principle of operation, to that of the pervious portion of the table which acts upon the comminuted material in proportion to the difference in specific gravity of the components thereof, while the impervious channels of the table act upon the comminuted material strictly according to the size of the particles. This can be clearly understood as the action of the pervious portion of the table upon an unsized mass of comminuted material, is to place the heavier values of the ore, nearest the pervious surface with a larger piece of the lighter mineral or gangue of the same specific gravity. The table being transversely inclined and reciprocated, causes the particles to be propelled longitudinally thereon and at the same time to gravitate transversely into the impervious channels, the smaller particles of the mass containing the fine particles of values, settling into the bottom of the channels, thus crowding the larger particles toward the top of the channels as the mass is propelled forward by the differential action of the table.

In order to clearly illustrate this action, we will consider that the larger particles are the waste or gangue, and that they are in the channels on top of smaller particles of value. As the table is reciprocated so as to propel the material within these channels, the larger particles will be gradually crowded out by the smaller particles and moved transversely across the table as the balance of the mass continues to progress along the table longitudinally thereof.

As the channels have a constantly diminishing capacity, immediately after the first class of particles is discharged therefrom, the next larger particles which represent the next lighter components follow in the same manner until the finer particles are deposited with their companions of large particles of value, upon the unobstructed portion of the surface beyond the ends of the channels. At this point, they are acted upon in identically the same manner as disclosed in our prior patents.

It has been found in practice that when acting upon certain classes of ore, it was impossible to separate certain values and the object of this invention is to overcome this objection, and it is especially advantageous in separating complex sulfid ores. As an example, the complex sulfid ore mentioned, is amenable to this process of separation. It is first delivered to the pervious unobstructed portion of the table at the point of feed at which point, it is acted upon by the upward pressure of air through the pervious surface which stratifies the particles thereof, the layer next to the surface, consisting of all of the heavier particles of the mass.

This layer of particles will consist, if composed of sulfid of lead, iron, zinc and waste or gangue, of particles of all the elements mentioned, only in different proportions as to size. In the stratum with the lead, will exist the large particles of iron which have the same weight; in the iron stratum will exist the finer iron particles with the coarser zinc particles; and in the zinc stratum will exist the coarser gangue particles with the finer zinc particles, it, of course, being understood that the air pressure through the pervious floor and material thereon, prevents any of the finer heavier particles from settling through the coarser particles on the surface and when the mass in is in this condition, it will pass transversely across the table, each channel having the following actions:

The finer particles which are the lead being released by the air, settle to the bottom of the channels and crowd the coarser gangue particles out first over the top of the channels as the mass proceeds longitudinally upon the table and as these channels are constantly diminishing in depth, they lose their capacity to hold these particles and the next coarser particles, which are the zinc particles, are crowded out of the channels leaving the remaining iron and lead particles to progress when the same operation is continued, the larger iron particles being forced out by the lead particles which report last at the blank or unobstructed portion of the surface.

It must be understood that the entire mass fed onto the sizing and separating apparatus, does not consist of unsized particles differing in size to any extent, as the mass is sized before being fed upon the table and that portion of the mass of particles which is uniformly sized, is perfectly separated into separate zones of different minerals and separately collected. The unsized particles, however, caused by attrition or imperfect sizing, in the mass when subjected to a separating action upon tables as hereinbefore mentioned, report in the wrong zones as the fine particles of lead report in the iron zone, the finer particles of the iron in the zinc zone, and the fine particles of the zinc in the gangue zone, thereby making a defective separation.

In order to avoid this last objection so as to obtain a perfect separation, we have discovered that by placing upon a separating table having a pervious top, longitudinally arranged channels, these fine particles caused by imperfect sizing and attrition with one another, can be collected and forced by the propelling movement of the table into the proper zones and maintained, as when the fine particles are prematurely discharged from one of the sizing channels, they are caught by the next succeeding channel until finally the fines of each value, report in the proper zone with the other particles of the same kind.

Other and further objects and advantages of the invention will be hereinafter set forth and the novel features thereof defined by the appended claims.

In the drawings—

Fig. 3ª, is a perspective of this form of sizing channel, detached;

Fig. 4ª, is a perspective of one of the channels, detached;

Fig. 5ª, is a perspective of this form of channel, detached;

Fig. 11, is an enlarged transverse section through one of the sizing channels as shown in Figs. 1, 2, 3 and 3ª, the comminuted material being shown in the position which it assumes when deposited therein, the smaller heavier particles being arranged at the bottom of the channels which gradually increase in size toward the top thereof so that the larger particles are gradually crowded out by the smaller particles as they are projected longitudinally within the channels.

Like numerals and letters of reference refer to like parts in the several figures of the drawings.

In the drawings, 1 indicates the base frame of our new separating and sizing apparatus which is provided with cup bearings 2 in which are mounted spring supports 3 on which is arranged, a transversely inclined table 4 which is reciprocated longitudinally by a driving mechanism 5 through the medium of a driving rod 6, the driving mechanism being substantially as disclosed in our former patents so as to obtain a slow advance and a quick return in order to impart a longitudinal propelling movement to the material being treated thereon.

A preferred form of table comprises a rectangular frame 7 and casing 8 in order to form an air chamber 9 which is provided with nipples 10 to which are connected flexible air inlet pipes 11 extending from a supply pipe 12 connected to a suitable source of supply 13, in order to maintain a uniform air pressure within the chamber for the purpose later described.

The frame 8 is provided with longitudinally arranged floor-supporting ribs 14 on which is arranged a pervious floor 15 formed of any suitable texture and upon which the material is adapted to be discharged and through which air is adapted to pass in order to support the material deposited thereon, upon an elastic cushion of air or other gaseous medium, which is clearly set forth in our prior patents.

A suitable feed hopper is arranged to deliver comminuted material onto the table at its upper end and the table is provided with a delivery shelf 16 at its lower edge and a delivery shelf 17 at its end, which are provided with the usual rails and cutting fingers as clearly set forth in our prior patents.

Figure 1:
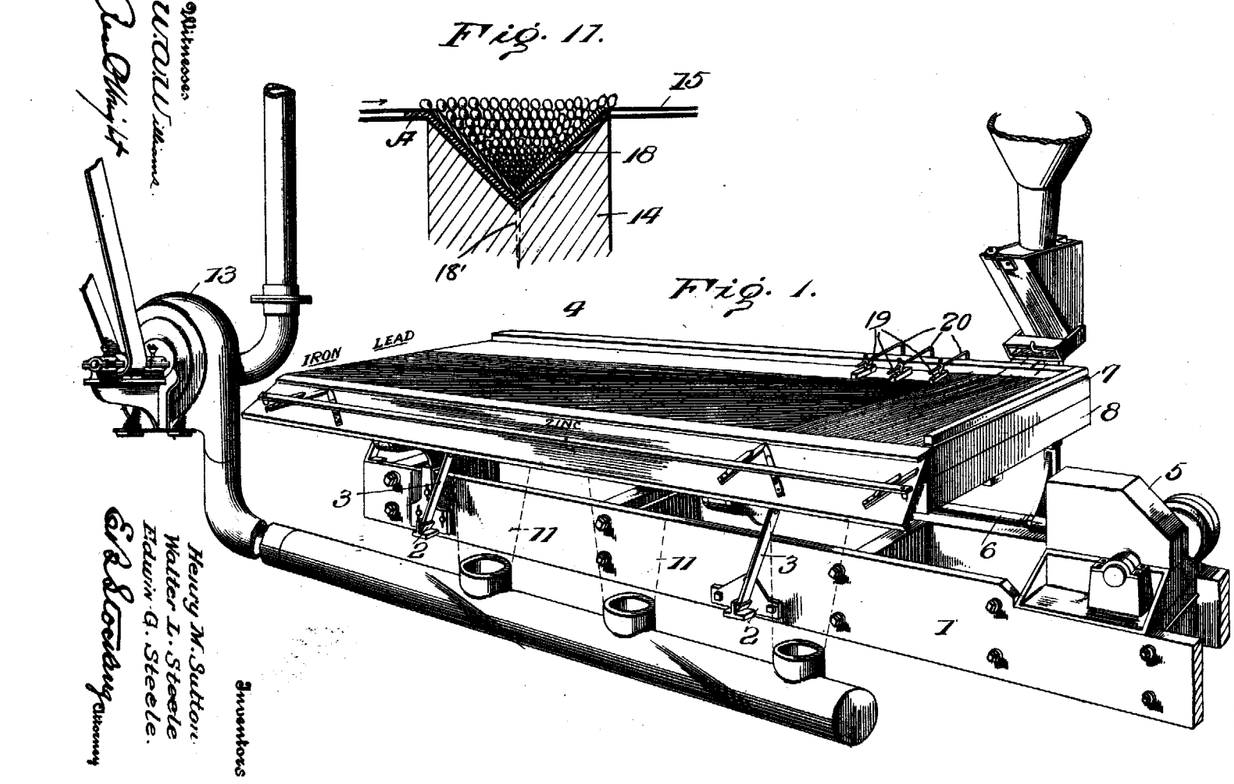
Figure 1, is a perspective of our improved form of apparatus for carrying out the process of sizing and separating comminuted material.
Figures 2, 3A, 4A, 5A:
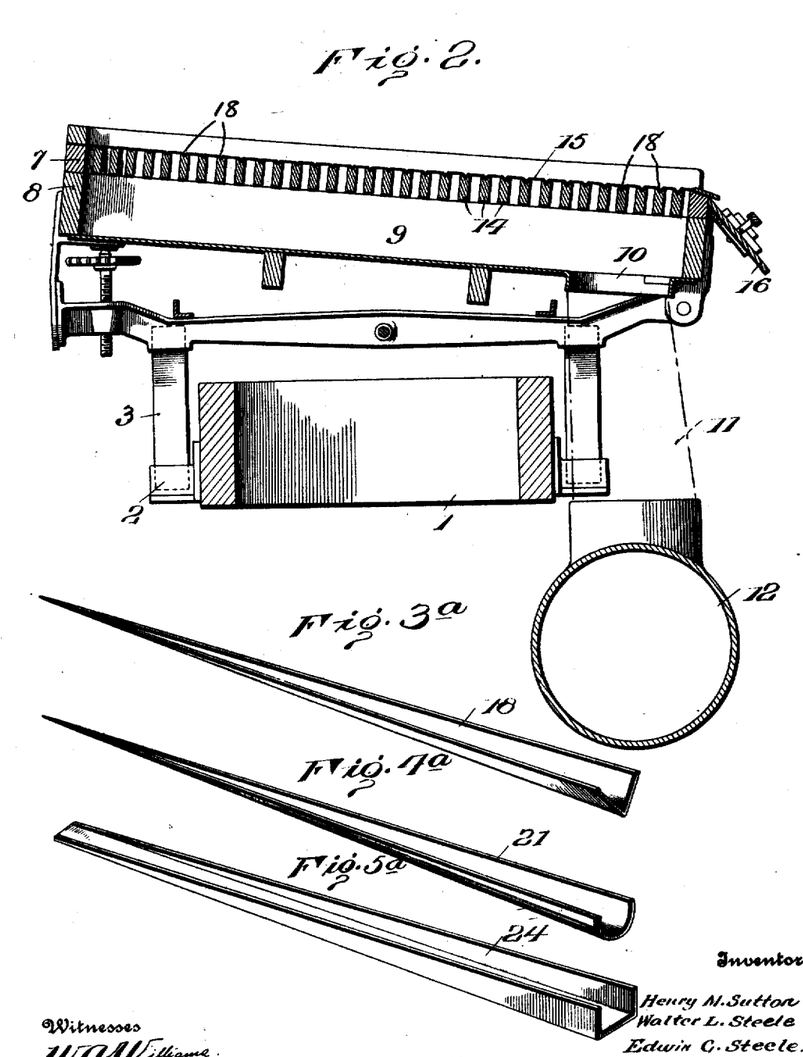
Fig. 2, is a transverse section through the apparatus, showing the same adjusted at an incline transversely in order to cause the particles of the mass to gravitate thereon.
Figure 3:
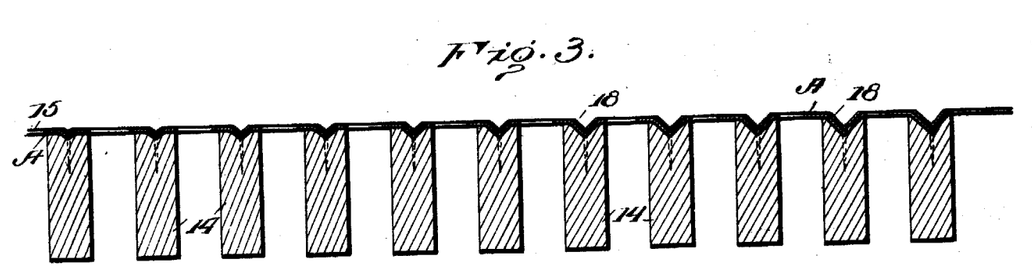
Fig. 3, is an enlarged detail section through a portion of the sizing surface showing the preferred form of sizing channel.

In the construction of table as shown in Figs. 1, 2, 3, 3ª, 6, 8 and 10, the supporting ribs 14 are longitudinally grooved adjacent the head end of the table to receive tapering sizing channels 18 which are substantially V-shaped in cross section and taper toward their ends in such a manner that each channel formed thereby gradually decreases in depth and width until it terminates at a point which is flush with the pervious surface of the table.

These sizing channels gradually increase in depth and length from the feed side toward the discharge side of the table and are adapted to be secured within the correspondingly-shaped grooves of the supporting ribs 14 by suitable fastening members 18′ which are embedded therein in such a manner that the inner surface of the channel is free from obstruction.

In constructing these channel members, an exceedingly smooth metal strip is employed in order to form the least resistance possible to the particles deposited therein so as to allow the particles to be propelled by the propelling movement of the table longitudinally therein.

As the heavier minerals come into contact with the separating surface, they are propelled longitudinally thereon and at the same time gravitate into the channels which are impervious and the finer particles gradually force the larger particles out of the channels as they are propelled longitudinally therein so as to cause the particles to report in the proper zone.

It will be seen that these channels are very shallow adjacent the point of feed, where the material has not accumulated to any great extent and it is only necessary to provide short and shallow channels to receive the heavier fine particles and by increasing the length and depth of these channels as the material accumulates upon the surface, the comminuted material is sized and separated in such a manner that all of the particles, regardless of size, will report in their respective zones as the smaller or heavy particles, which remain within the channels, are propelled longitudinally therein onto the unobstructed surface.

In this form of apparatus, these channels terminate at a line drawn diagonally from the upper to the lower corner of the table at which point, the retarding strips also terminate so as to allow the material which is deposited upon the unobstructed surface beyond this point, to be acted upon in the well-known manner as described in our prior patents.

In placing the sizing channels in position upon the pervious-topped table, as herein shown and described, the pervious textile is placed in position upon the frame of the table without being stretched so as to allow the textile to be forced into the grooves by the sizing channels and when the channels are secured in position therein, the textile will be stretched tightly across the frame so as to form a smooth surface. It will be seen by this construction that the surface of the table is formed with impervious channels having intermediate pervious surfaces upon which the air acts upon the material in its movement over the same, whereby the material is intermittently stratified according to specific gravity and then released so as to allow the heavier and finer particles to drop into the channels where they are protected from the air and are propelled longitudinally therein by the propelling movement of the table.

A series of initial banking bars 19 are arranged adjacent the feed end of the table which are adjustably carried by rods 20 and are so arranged in respect to the feed hopper that when the material is deposited upon the table an initial banking is obtained so as to cause the material to stratify and spread in its movement thereon.

Figure 4:
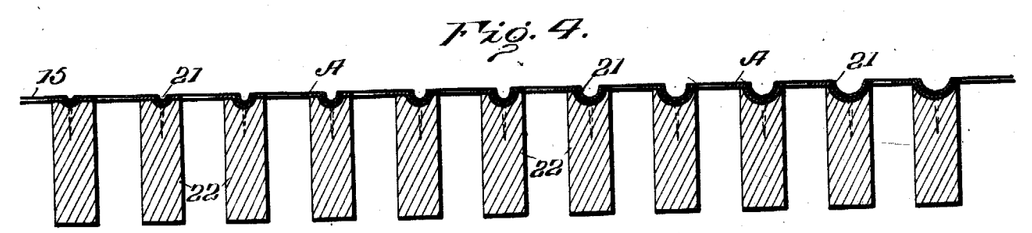
Fig. 4, is a detail transverse section through a sizing surface showing a slightly modified form of sizing channel.

In the modified form of sizing channels as shown in Figs. 4 and 4ª, instead of employing a channel V-shaped in cross section, a channel 21, semi-circular in cross section, is employed which is secured in semi-circular grooves formed in the ribs 22 in identically the same manner as the channels 18 and perform the same function of sizing the particles deposited therein.

Figure 5:
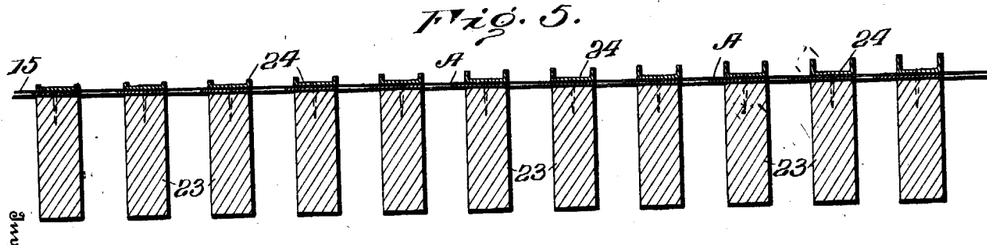
Fig. 5, is a detail transverse section through a sizing surface showing another modified form of sizing channel which is placed above the surface.
Figure 6:
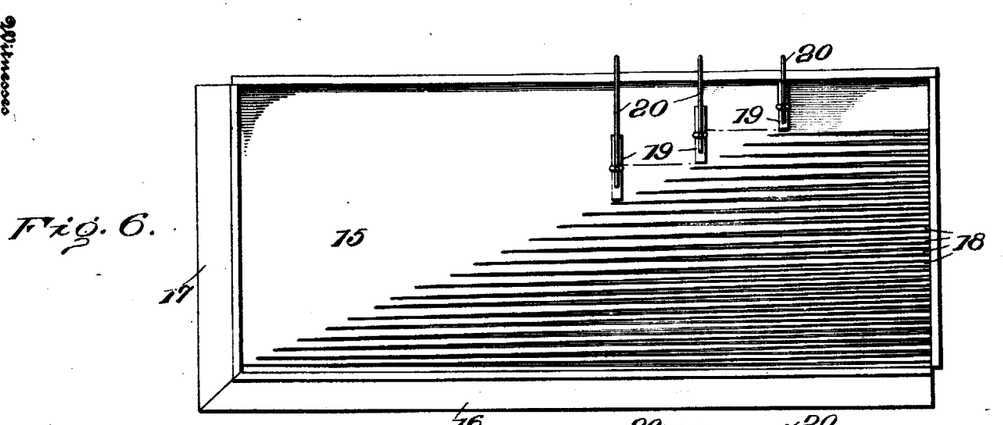
Fig. 6, is a plan view of a sizing surface as disclosed in Figs. 1, 2, 3 and 3ª showing the initial banking bars to retard the material at the point of feed so as to cause the particles thereof to stratify according to specific gravity, whereby they will gravitate at an angle to the propelling movement of the particles.

In the form of channels as shown in Figs. 5 and 5ª, instead of grooving the ribs 23, we place upon the pervious surface above each rib, a substantially U-shaped channel 24 which is secured in position thereon by fastening means passing through the channels into the ribs, said channels increasing in height and length from the feed side of the table toward the discharge side thereof, but do not decrease in width as do the V and semi-circular channels 18 and 21. With this construction of channel, identically the same operation takes place on a table as the material thereon is floated by the air pressure, so as to allow the heavier particles to drop into the channels from which they are discharged by the propelling movement of the table, the larger particles being gradually crowded out by the smaller particles accumulated therein. It will be seen that with this construction, when the table is inclined transversely, a channel is formed which has obliquely arranged sides.

Figure 7:
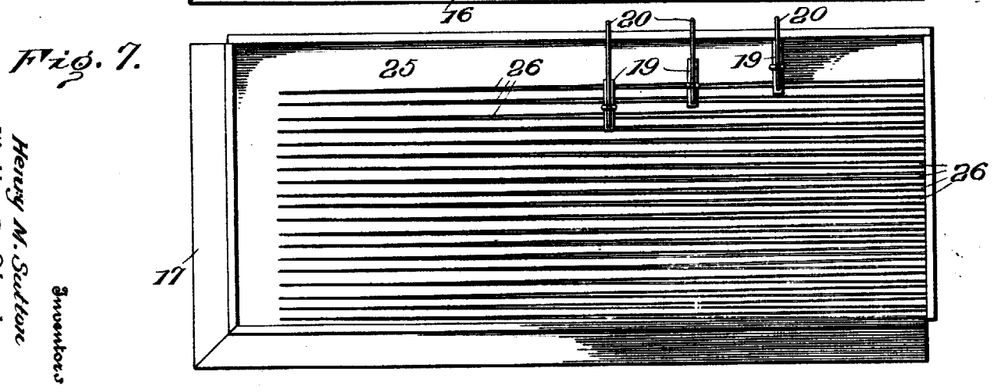
Fig. 7, is a top plan view of a separating and sizing surface showing a slightly modified form in which the sizing channels are extended.
Figure 8:
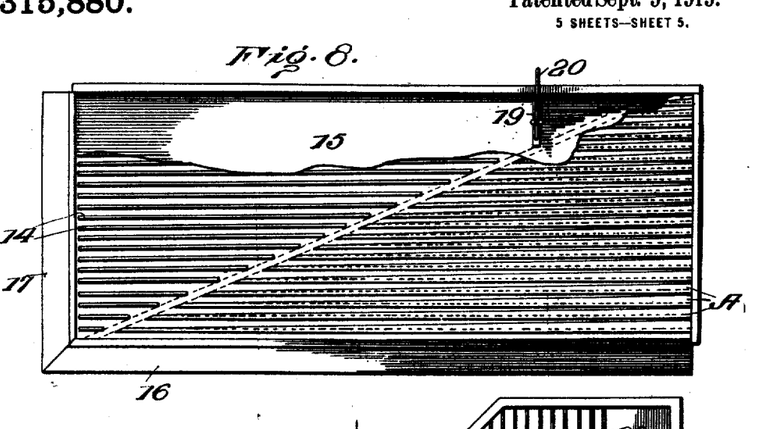
Fig. 8, is a plan view of a deck frame showing the retarding strips in position upon the supporting ribs.

In the modification shown in Fig. 7, we show a table 25 provided with sizing channels 26 all of the same length. These channels can be formed of any one of the forms hereinbefore described, as we have found that a sizing and separating action can be obtained upon a table constructed in this manner with better results when acting upon certain kinds of ore, than with a table having sizing channels which gradually increase in length from the feed toward the delivery side thereof.

Figures 9, 10:
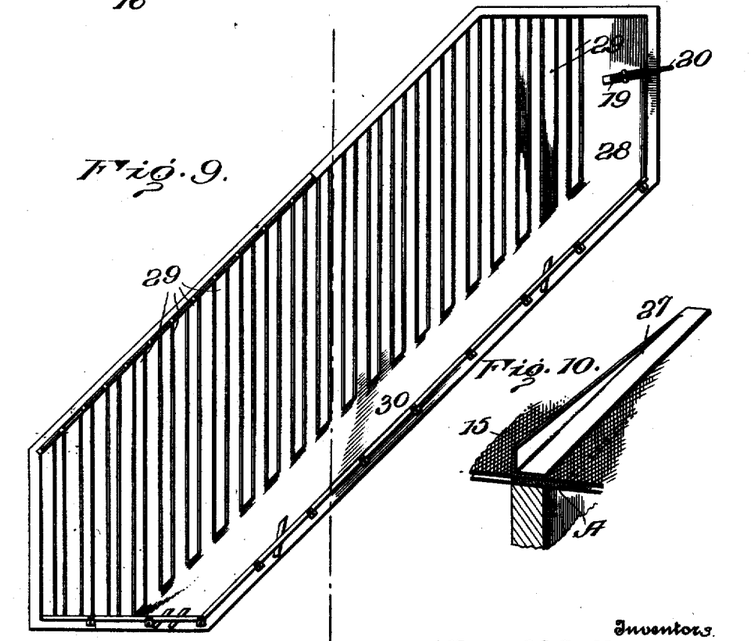
Fig. 9, is a plan view of another modified form of a separating and sizing apparatus in which the shape is changed, said sizing apparatus having a banking bar at the end of the unobstructed portion by means of which, the values can be cut out of the mass or allowed to gravitate.
Fig. 10, is a detail perspective of a separating surface showing a slightly modified form of sizing channel formed L-shaped, which becomes a channel when the table is inclined transversely in order to size the particles.

In the modification shown in Fig. 10, instead of providing a separating surface with substantially U-shaped channels, we provide an L-shaped channel which is secured in position upon the surface over each rib in identically the same manner as the U-shaped channels and when the table is arranged at an angle, a substantially V-shaped channel is formed to receive the heavier particles which obtains the same result as the heavier particles accumulate therein and gradually force the larger particles out of the same.

In Fig. 9, we show a slightly modified form of table 28 in which the shape is changed, the same being arranged so that it is adapted to be reciprocated so as to cause the particles to be propelled longitudinally within the channels 29 which may be of any form desired and in this form of table, a banking bar 30 is employed at the end of the unobstructed portion.

In connection with the sizing channels we employ retarding strips A constructed substantially in the same manner as disclosed in our prior Patent #898,020 which are preferably V-shaped and these strips also increase in width and length from the feed side toward the discharge side of the table, these strips projecting above the ribs toward the feed of the table in order to reduce the air pressure upon the mass slightly before the particles reach the sizing channels so as to allow the heavier particles to come into contact with the surface of the table as the air pressure is reduced at this point, which is insufficient to cushion or support the heavier minerals.

From the foregoing description, it will be seen that we have incorporated in a separating table having a pervious surface, a number of sizing channels which converts the table into a sizing and separating apparatus by means of which the process of sizing and separating comminuted material can be carried out with better results.

In the specification and drawings we have shown and described a concentrating table with a pervious surface on which is arranged one of several forms of sizing channels and we wish it to be clearly understood that we do not wish to limit ourselves to any particular form of sizing channel to be used in connection with a concentrating table, as clearly covered by our prior patents, as various other forms of sizing channel can be used in order to collect the finer and heavier particles of the mass in its movement over the surface so as to convey the particles of value into the zones containing the same class of particles.

While we have described the sizing channels used in connection with our prior patents in order to produce a sizing and separating apparatus, it is, of course, understood that the same can be used in connection with any form of pervious top table employing a differentiating action so as to obtain a slow forward movement and a quick return, as we are aware that there are several other forms of pervious top table arranged horizontally having a differentiating action for causing the particles to travel differentially upon its surface and, therefore, we do not wish to limit ourselves to any exact form of table, as the sizing channels can be placed in position upon various forms of separating table in order to convert a separating table into a sizing and separating apparatus, without departing from the spirit of our invention.

We claim:

1. The process of concentrating from a mass of material, the parts thereof having different characteristics consisting in supporting the material upon a transversely inclined surface by a gaseous cushioning medium divided into parallel air stratifying areas, feeding said material in one path successively, collecting the heavier particles of said material to a depth including a plurality of grains in its movement by gravity upon areas totally obstructed against the passage of air stratifying currents and sizing said heavier particles in its projecting movement upon said obstructive areas.

2. The process of concentrating a mass of material, parts thereof having different characteristics, consisting in supporting the material upon a transversely inclined surface by a gaseous cushioning medium separated into stratified areas in the line of gravital flow, feeding said material in one path, collecting the heavier particles of said material in masses of substantial depth in its movement by gravity in areas obstructed against the passage of stratifying currents, and sizing said heavier particles in their imparted movements in said obstructed areas.

3. The process of sizing a mass of material, parts thereof having different characteristics, consisting in successively supporting the material upon a surface by a gaseous cushioning medium, feeding said material in one path, subjecting said material to the action of gravity, imparting to said material a positive movement across the path of travel by gravity, collecting the heavier particles of said material in masses of substantial depth in its movement by gravity in separated areas obstructed against the passage of stratifying currents, and sizing said particles in their imparted movements in said obstructed areas.

4. The process of concentrating from a mass of material, parts thereof having different characteristics, consisting in supporting the material upon a surface by a gaseous cushioning medium in separated stratifying areas to permit stratification thereof, feeding said material in one path, simultaneously imparting to a portion of said material a positive movement in a direction crossing said path, collecting the heavier particles of said material in masses of substantial depth in their movement by gravity in areas obstructed against the passage of stratifying currents, sizing said heavier particles in their imparted movement in said obstructed areas, and separately collecting the thus separated particles.

5. The process of concentrating from a mass of material, parts thereof having different characteristics, consisting in supporting said material upon a transversely inclined surface, successively in line of gravitational flow in separated air stratifying areas, imparting to said material a movement in a direction crossing the movement of said material by gravity, sizing the heavier particles in masses of substantial depth in their propelling movement in separated areas obstructed against the passage of stratifying currents and separately collecting the thus separated particles.

6. In a sizing and separating apparatus, the combination with a pervious floor, means for maintaining successive zones of separated material in areas obstructed against the passage of stratifying currents, means for maintaining a uniform upward pressure of air through the unobstructed portion of said floor and the material upon it, and means for propelling the material upon said floor and in said obstructed areas to cause the material in said unobstructed areas to be sized in the propelling movement thereof.

7. In a sizing and separating apparatus, the combination with an inclined pervious floor having its surface provided with separated stratifying areas and impervious sizing channels adapted to retain material of a depth including a plurality of overlying grains and a plain space at the discharge end thereof, means for maintaining an upward pressure of air through the pervious floor and the material upon the pervious portion thereof, means for projecting the material longitudinally upon said surface in the separated stratifying areas and the sizing channels, and means for separately collecting the thus separated particles.

8. A sizing and separating apparatus having a pervious floor having its surface provided with longitudinally disposed impervious channels adapted to retain material a plurality of grains deep and terminating in an unobstructed portion, means for maintaining beneath said surface an upward pressure of air through the pervious floor and the material upon it, means for retarding said air adjacent said channels, and means for reciprocating said floor.

9. In a separating and sizing apparatus, the combination with a floor having a pervious surface, of a series of parallel impervious channels arranged upon said surface gradually increasing in length and depth from the feed to the discharge side of said surface, means for maintaining an upward pressure of air through said surface and the material upon it, and means for retarding said air adjacent said channels.

10. In a concentrating table, means for imparting movement to the material in a predetermined direction, a floor inclined transversely to the travel of the propelling movement of the material thereon, longitudinally arranged impervious channels adapted to retain material a plurality of grains deep and mounted upon said floor increasing in length from the upper edge toward the lower edge thereof, and means for projecting the material longitudinally upon said surface and in said channels.

11. The process of sizing and separating comminuted material, consisting in supporting the material upon a surface by a gaseous cushioning medium, feeding said material in one path, subjecting said material to the action of gravity, simultaneously imparting to said material a positive movement in a direction across the path of travel by gravity, collecting the finer and heavier particles of said material in masses of substantial depth in its movement by gravity in separated areas obstructed against the passage of stratifying currents, and sizing said finer and heavier particles in their projected movements in said areas.

12. The process of sizing and separating comminuted material, consisting in supporting the material upon a transversely inclined surface by a gaseous cushioning medium to cause the material to gravitate thereon, imparting to said material a positive movement in a direction crossing the gravitational movement of said material, successively collecting the finer and heavier particles of said material in masses of substantial depth in their movements by gravity in separated areas obstructed against the passage of stratifying currents, and sizing said heavier particles in their propelling movement in said areas.

13. The process of sizing and separating comminuted material, consisting in supporting the material upon a transversely inclined surface by a gaseous cushioning medium to cause the particles thereof to stratify and to move by gravity in approximately transverse lines, imparting to said material a positive movement to cause the material to move longitudinally upon said surface, successively collecting the heavier and finer particles of said material in masses of substantial depth in their movement by gravity in separated areas obstructed against the passage of stratifying currents and sizing said heavier particles in their longitudinal movement upon said obstructed areas.

14. The process of sizing and separating comminuted material, consisting in supporting the material by a gaseous cushioning medium upon a transversely inclined surface provided with separated parallel air stratifying areas and separated areas obstructed against the passage of stratifying currents to cause the particles to stratify and to gravitate thereon, imparting a positive movement to said material across the movement by gravity and collecting and sizing the heavier particles of said material in masses of substantial depth in their movement upon the separated areas obstructed against the passage of stratifying currents.

15. A sizing and separating table having an inclined pervious floor having a portion thereof provided with longitudinally disposed impervious channels obstructed against the passage of stratifying currents adapted to retain material a plurality of grains deep, means for maintaining a uniform upward pressure of air through said pervious floor in separated areas and the material upon said areas, and means for projecting the material longitudinally upon the air stratifying areas and channels.

16. A separating and sizing apparatus, comprising a transversely inclined floor having a pervious surface separated into air stratifying areas by a series of parallelly arranged sizing channels of different lengths and depths and adapted to retain the material of a plurality of grains deep and obstructed against the passage of air stratifying currents, means for feeding comminuted material upon said surface, means for projecting said material longitudinally upon said surface and in said channels, and means for collecting the separated particles.

17. In a separating and sizing apparatus having a transversely inclined pervious surface provided with longitudinally disposed sizing channels obstructed against the passage of stratifying currents, terminating at an unobstructed portion of said surface and of a depth adapted to retain a substantial layer of material and to discharge the larger particles by a transverse overflow and the finer particles by a longitudinal propulsion, means for feeding material upon said surface, means for maintaining a uniform upward pressure of air through said surface and the material thereon to stratify the particles thereof, and means for projecting material parallel with said channels, and means for separately collecting the thus separated particles.

18. A dry concentrating table, having a pervious floor, means for maintaining an upward pressure of air through said floor and the material thereon, impervious sizing channels arranged upon said floor diminishing in depth toward the discharge end thereof and terminating at different distances relative to a line extending transversely of the floor, said channels being of a depth adapted to retain a substantial layer of material and to discharge the larger particles by transverse overflow and the finer particles by longitudinal propulsion, means for feeding material upon said floor, means for projecting said material longitudinally thereon, and means for collecting the thus separated particles.

19. In a dry concentrating table, a pervious floor, means for maintaining an upward pressure of air through said floor and the material thereon, impervious sizing channels extending longitudinally of said floor of a depth adapted to retain a substantial layer of material and to discharge the larger particles by transverse overflow and the finer particles by longitudinal propulsion, means for feeding the material upon an unobstructed portion of said floor, and means for projecting said material longitudinally upon said floor.

20. In a dry concentrating apparatus, the combination with a deck frame having a series of parallelly arranged supporting ribs, of a pervious surface mounted upon said supporting ribs, impervious channels arranged upon said pervious surface above said ribs of a depth adapted to retain a substantial layer of material and to discharge the larger particles by transverse overflow and the finer particles by longitudinal propulsion, means for maintaining a uniform upward pressure of air through said surface and the material upon it, means for retarding the upward pressure of air through said surface adjacent said channels, and means for projecting the material longitudinally upon said surface.

21. A dry concentrating table, having a pervious floor, impervious sizing channels arranged longitudinally upon said floor of a depth adapted to retain a substantial layer of material and to discharge the larger particles by transverse overflow and the finer particles by longitudinal propulsion, air-retarding strips arranged adjacent said sizing channels and means for projecting said material longitudinally upon said floor and in said channels.

22. In a dry concentrating apparatus, the combination with a pervious surface with means for maintaining an upward pressure of air through said surface and the material thereon, of impervious sizing channels mounted upon said surface diminishing in depth toward the discharge end thereof where they terminate at an unobstructed portion of said surface of a depth adapted to retain a substantial layer of material and to discharge the larger particles by transverse overflow and the finer particles by longitudinal propulsion, and means for retarding the air through said surface arjacent said channels.

23. The combination with an inclined concentrating table having a pervious surface with means for maintaining a uniform upward pressure of air therethrough and the material upon it, of a series of impervious collecting channels arranged longitudinally upon said surface of a depth adapted to retain a substantial layer of material and to discharge the larger particles by transverse overflow and the finer particles by longitudinal propulsion, means for imparting movement to the material in a predetermined direction, and means for separately collecting the thus separated particles.

24. In a concentrating table, means for imparting movement to the material in a predetermined direction, a series of parallelly arranged impervious sizing channels mounted on said table of a depth adapted to retain a substantial layer of material and to discharge the larger particles by transverse overflow and the finer particles by longitudinal propulsion, means for initially stratifying the material deposited thereon, means for causing said material to move at an angle to the imparted movement, and means for separately collecting the thus separated particles.

25. The process of sizing and separating a mass of material the parts thereof having different characteristics, consisting in supporting the material in dry condition by a gaseous cushioning medium, intermittently moving said material, subjecting said material to the force of gravity to cause said material to move in lines deviating from the intermittent movement of said material, collecting the heavier particles of said material in masses of substantial depth in their movement by gravity in obstructed areas, sizing said collected particles by causing the larger particles to move transversely and the finer particles longitudinally in said obstructed areas, and separately collecting the thus separated particles.

26. The process of concentrating from a mass of material, parts thereof having different characteristics, consisting in supporting said material upon a surface by a gaseous cushioning medium to permit stratification thereof, propelling said material in one path, successively collecting particles of said material in a layer of substantial depth in its movement by gravity upon said surface in areas obstructed against the passage of stratifying currents, sizing said collected particles by causing the larger particles to move transversely and the finer particles longitudinally in the obstructed areas and separately collecting the thus separated particles.

27. The process of concentrating a mass of material, parts thereof having different characteristics, consisting in intermittently subjecting said material to a gaseous cushioning medium, intermittently collecting the particles of said material, in a layer of substantial depth in areas obstructed against the passage of stratifying currents, projecting said material in a predetermined direction to cause the collected particles to be sized by causing the larger particles to move transversely and the finer particles longitudinally, and separately collecting the thus separated particles.

28. A dry concentrating table having a pervious floor, sizing impervious channels arranged longitudinally upon said floor of a depth adapted to retain a substantial layer of material and to discharge the larger particles transverse by overflow and the finer particles by longitudinal propulsion, and means for reciprocating said table.

29. A dry concentrating table having a pervious floor and means for maintaining a uniform upward pressure of air through the floor and the material thereon, said floor having a portion of its area covered by sizing channels, obstructed against the passage of stratifying currents and of a depth adapted to retain a substantial layer of material and to discharge the larger particles by transverse overflow and the finer particles by longitudinal propulsion.

30. The combination with a concentrating table, having a pervious floor with means for maintaining a uniform upward pressure of air through the floor and the material thereon, a series of longitudinally arranged impervious sizing channels mounted upon said floor having diminishing capacities of a depth adapted to retain a substantial layer of material and to discharge the larger particles by transverse overflow and the finer particles by longitudinal propulsion, air-retarding strips arranged longitudinally under said surface adjacent said sizing channels, and means for reciprocating said table.

31. A separating apparatus, having a pervious floor provided with means for maintaining a uniform upward pressure of air therethrough divided into separated air stratifying areas, means for feeding the material upon said floor, means disposed between said separated air stratifying areas for collecting the material in a layer of substantial depth and sizing the material delivered upon said floor, means for reciprocating said floor and means for separately collecting the separated particles delivered from said floor by causing the larger particles to move transversely and the finer particles longitudinally.

32. A separating table, having a pervious floor, means for maintaining a uniform upward pressure of air through said floor in separated parallel air stratifying areas, means for collecting the smaller particles of the mass delivered upon said table in a layer of substantial depth adjacent said separated parallel areas, means for causing the larger particles thus collected to move transversely, and the finer particles longitudinally, and means for separately collecting the separated particles.

33. A concentrating table, comprising a frame provided with grooved supporting ribs, a pervious floor arranged upon said frame, impervious sizing channels arranged upon said floor and secured within the grooves of said ribs of a depth adapted to retain a substantial layer of material and to discharge the larger particles by transverse overflow and the finer particles by longitudinal propulsion and means for reciprocating said concentrating table.

34. A concentrating apparatus having a pervious floor with means for maintaining a uniform upward pressure of air through the floor and material thereon, a series of impervious sizing channels of a depth adapted to retain a substantial layer of material and to discharge larger particles thereof by a transverse overflow and the finer particles by longitudinal propulsion arranged on said floor and having diminishing capacities in line of the propellent movement of said table, means for projecting said material upon said surface and in said channels and simultaneously causing said material to be moved in lines deviating from the line of normal movement and separately collecting the separated particles.

35. A concentrating table, comprising a frame provided with supporting ribs, a pervious floor arranged upon said frame, means for maintaining a uniform upward pressure of air through said floor and material thereon, impervious sizing channels arranged upon said floor and secured upon said ribs of a depth adapted to retain a substantial layer of material and to discharge the larger particles by transverse overflow and the finer particles by longitudinal propulsion, and means for reciprocating said concentrating table.

36. A dry concentrating table having a pervious floor, means for maintaining a uniform upward pressure of air through said floor, impervious sizing channels arranged longitudinally upon said floor of a depth adapted to retain a substantial layer of material and to discharge the larger particles by transverse overflow and the finer particles by longitudinal propulsion, gradually terminating in unobstructed portions and retarding strips arranged adajacent said channels.

37. A concentrating table having a pervious floor with means for maintaining a uniform upward pressure of air through the floor, and the material thereon, means forming parallel air stratifying areas, a series of sizing channels obstructed against the passage of stratifying currents arranged on said floor in line of gravital flow, of a depth adapted to retain a substantial layer of material and to discharge the larger particles by transverse overflow and the finer particles by longitudinal propulsion and means for separately collecting the thus separated particles.

In testimony whereof we hereunto affix our signatures in the presence of two witnesses.

HENRY M. SUTTON.
WALTER L. STEELE.
EDWIN G. STEELE.

Witnesses:
J. N. SPARKS,
JOHN C. JOHNSON.

Copies of this patent may be obtained for five cents each, by addressing the "Commissioner of Patents, Washington, D. C."